United States Patent
Satish et al.

(10) Patent No.: US 8,434,149 B1
(45) Date of Patent: Apr. 30, 2013

(54) METHOD AND APPARATUS FOR IDENTIFYING WEB ATTACKS

(75) Inventors: Sourabh Satish, Fremont, CA (US); Zulfikar Ramzan, Cupertino, CA (US)

(73) Assignee: Symantec Corporation, Mountain View, CA (US)

(*) Notice: Subject to any disclaimer, the term of this patent is extended or adjusted under 35 U.S.C. 154(b) by 1270 days.

(21) Appl. No.: 12/004,594

(22) Filed: Dec. 21, 2007

(51) Int. Cl.
  *G06F 12/14* (2006.01)
  *G06F 12/04* (2006.01)

(52) U.S. Cl.
  USPC .............. 726/22; 726/23; 726/24; 726/26

(58) Field of Classification Search .............. None
  See application file for complete search history.

(56) References Cited

U.S. PATENT DOCUMENTS 7,725,602 B2 * 5/2010 Liu et al. ............... 709/245
7,853,533 B2 * 12/2010 Eisen ..................... 705/64
2007/0277231 A1 * 11/2007 Medvinsky et al. ....... 726/5

OTHER PUBLICATIONS

Jackson, Collin et al., "Protecting Browsers from DNS Rebinding Attacks," CCS'07, Oct. 29-Nov. 2, 2007, Alexandria, Virginia. Copyright 2007 ACM 978-1-59593-703-02/07/0011.

* cited by examiner

*Primary Examiner* — Pramila Parthasarathy
(74) *Attorney, Agent, or Firm* — Wilmer Cutler Pickering Hale and Dorr LLP

(57) ABSTRACT

A method and apparatus for identifying web attacks is described. In one embodiment, a method of securing a computer comprises generating origin information for a portion of a web page and identifying a modification in the origin information. The identified modification is used to determine an indicia of suspicious behavior at a computer.

18 Claims, 4 Drawing Sheets

METHOD AND APPARATUS FOR IDENTIFYING WEB ATTACKS

BACKGROUND

1. Technical Field

Embodiments of the present disclosure generally relate to computer security and, more particularly, to method and apparatus for identifying web attacks.

2. Description of the Related Art

Web users employ browser applications to navigate the Internet and view active and static content on one or more web pages. Many browser applications enforce a "same origin" policy during the web browsing session to prevent an attacker at a first origin from attacking a computer at a second origin. Generally, the "same origin" policy specifies the circumstances in which the first origin can access a resource at the second origin. Particularly, the "same origin" policy prevents content associated with the first origin from reading or setting the attributes of content that is loaded into the browser window from the second origin. For example, according to "same origin" policy, the browser application considers two objects as belonging to the same origin if, and only if, they are associated with the same domain name, protocol type and port number.

Hackers attack computers by exploiting one or more weakness of the "same origin" policy. For example, the "same origin" policy is only concerned with domain names and not IP addresses. Content (e.g., objects) is not accessed through the domain name but an Internet Protocol (IP) address that is associated with the domain name. Specifically, the domain name resolves to the IP address within a Domain Name System (DNS). If multiple IP addresses (e.g., from different entities) are associated with the same domain name, the "same origin" policy is still satisfied for various objects associated with the same domain name even though the various objects may be retrieved from the multiple IP address.

By confusing the browser application with multiple addresses for a single domain, the hacker is able to undermine the "same origin" policy and perform unwanted activities on another computer using the attack computer as a proxy. The hacker can circumvent firewalls to spider corporate intranets, infiltrate sensitive material (e.g., documents) and compromise unpatched (I.e. unprotected) internal computing devices.

Typically, the browser application defends such an attack through DNS pinning where information regarding a domain name resolved to a particular IP address is saved in cache for a fixed period of time. Unfortunately, DNS pinning is not effective against attacks that use active content to mount a DNS rebinding attack because a malicious program manipulates round robin DNS response types to switch the particular IP address that resolves to the domain name with an another IP address that resolves to a different domain name. The malicious program is able to control the frame or object associated with the different domain name through another IP address.

Therefore, there is a need in the art for a method and apparatus for identifying web attacks that exploit the vulnerabilities of the "same origin" policy in order to secure the computer.

SUMMARY

Embodiments of the present invention, generally, comprise a method and apparatus for securing a computer. In one embodiment, a method of securing a computer comprises generating origin information for a portion of a web page and identifying a modification in the origin information. The identified modification is used to determine an indicia of suspicious behavior at the computer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
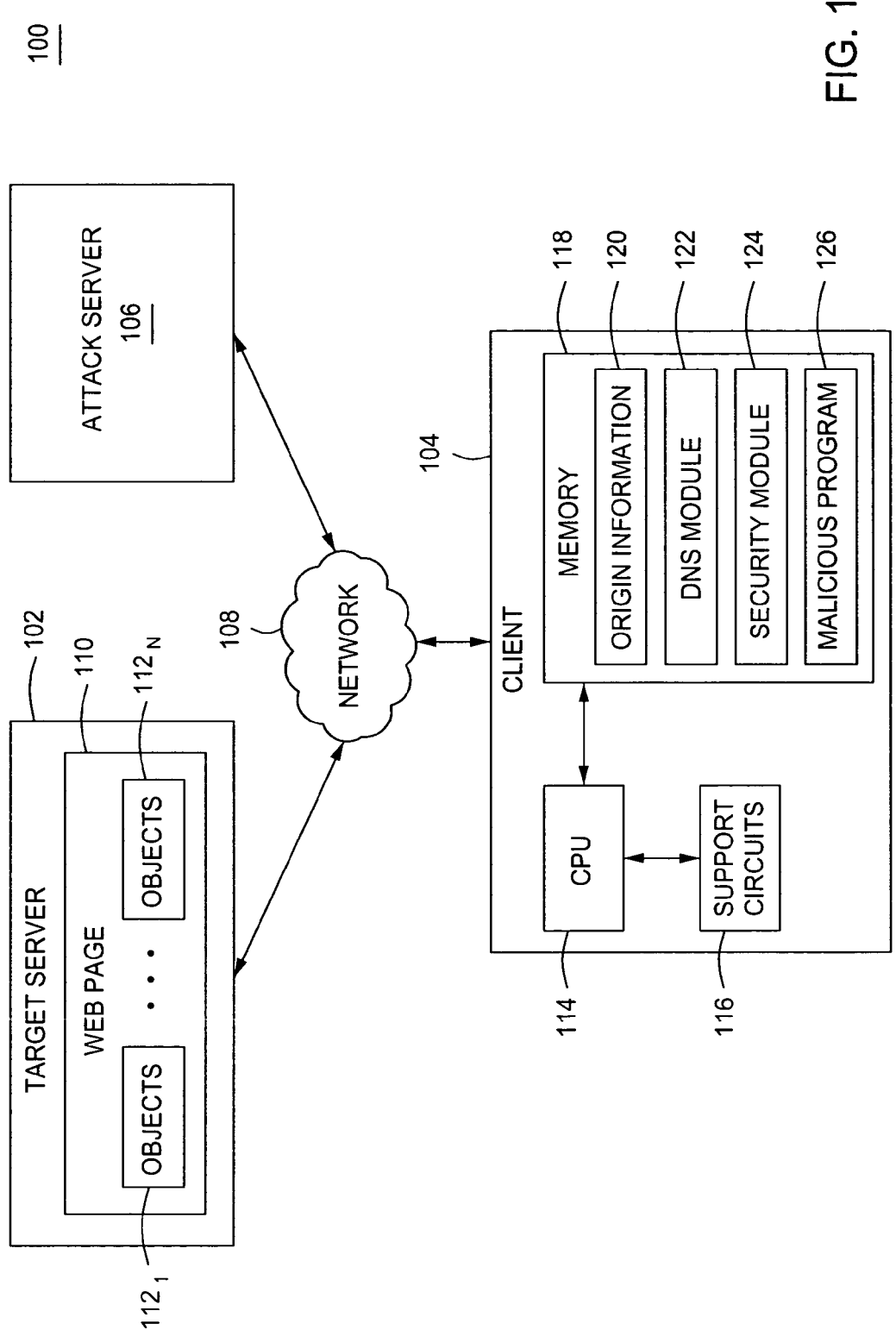
FIG. 1 is a block diagram of a system for securing a computer, according to one or more embodiments of the present invention.

FIG. 1 is a system 100 for securing a computer, according to various embodiments. The system 100 includes a target computer 102, a client computer 104 and an attack computer 106, coupled to each other through a network 108. It is appreciated that alternate embodiments of the system 100 are also envisioned by the present disclosure. For example, the system 100 may comprise an internal network coupling the target computer 102 with the client computer 104. As another example, the system 100 may comprise a plurality of target computers coupled to the client computer 104.

The network 108 comprises a communication system that connects a computer system by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

The target computer 102 may be any type of networked computing device adapted to provide web services such as objects 112. In one embodiment, the objects 112 include static and/or active web content (e.g., images, video, audio, animation, documents, programs, services and the like). In one embodiment, the target computer 102 is a web server associated with a legitimate web site, which generates and distributes static and/or active web content to the client computer 104 through the network 108 (i.e. throughout the Internet). In operation, a browser application (e.g., executed by the client computer 104) issues a request to the target computer 102 for a piece of web content and the target computer 102 responds by transmitting the piece of the web content for presentation on a window generated by the browser application. In another embodiment, the target computer 102 is a database system or a server (e.g., internal) for distributing the objects 112 (e.g., documents, services, files, images, video programs and the like) within an enterprise (e.g., VPN, Intranet). For example, the target computer 102 may be protected by (i.e., behind) a firewall setup by the enterprise.

The attack computer 106 may be any type of networked computing device configured to compromise other computing devices (e.g., the client computer 104). For example, hackers can distribute malicious code using the attack computer 106 as a web computer. By purchasing a domain and planting pop-up advertisements throughout the Internet, the hackers can gain control of the client computer 104 when a user on the client computer 104 clicks on or simply views the pop-up advertisement. Through the client computer 104, hackers on the attack computer 106 can obtain access to the target computer 102 by piggybacking off of the trust associated with the client computer 104. For example, if the target computer 102 and the client computer 104 are behind the firewall, then the attack computer 106 can circumvent the firewall and obtain access to the target computer 102.

The client computer 104 may be any type of networked computing device (e.g., laptop, desktop, Personal Desk Assistant (PDA), tablet and the like). The client computer 104 includes a central processing unit (CPU) 114, various support circuits 116 and memory 118. The CPU 114 may comprise one or more commercially available microprocessors or microcontrollers that facilitate data processing and storage. Various support circuits 116 facilitate operation of the CPU 114 and may include clock circuits, power supplies, input/output circuits and/or the like. The memory 118 includes a read only memory, random access memory, disk drive storage, optical storage, removable storage, and the like. The memory 118 includes various data, such as origin information 120. The memory 118 includes various software packages, such as a DNS module 122, a security module 124 and a malicious program 126. The malicious program 126 is any set of processor-executable instructions for performing one or more web attacks (e.g., hijacking a computer, bypassing a firewall and the like).

The DNS module 122 cooperates with the security module 124 to secure the client computer 104. In operation, the DNS module 122 generates the origin information 120 for the web page 110 and the objects 112, as described below. In one embodiment, the origin information 120 includes information pertaining to a distinct IP address and/or a distinct domain associated with each object of the objects 112. For example, the origin information 120 includes an IP address and/or a domain name of the target computer 102 as the target computer 102 distributes the web page 110 to the client computer 104. The generation of the origin information 120 enables the identification of one or more modifications to the origin information 120 by the malicious program 126 and/or mitigation of a web attack perpetrated by the malicious program 126 (e.g., a DNS rebinding attack). Furthermore, the origin information 120 facilitates detection of the web attack at the client computer 102 through determination of an indicia of suspicious behavior. For example, if the origin information 120 is modified to indicate two or more IP addresses bound to a same domain name and/or one internal IP address (e.g., the target computer 104) and one external IP address (e.g., the attack computer 106) bound to the same domain name, such modifications are suspicious and the client computer 102 is mostly likely being attacked (e.g., through the network 108 from the attack computer 106).

The security module 124 identifies modifications to the origin information 120. The identified modifications to the origin information 120 may be determined to be various indicia of suspicious behavior perpetrated by an attacker using the attack computer 106. In one embodiment, suspicious behavior occurs when the malicious program 126 modifies the DNS information stored for one or more of the objects 112 to associate the IP address of the attack computer 106 with the domain of the target computer 102. Here, the attacker wants the client computer 104 to communicate with the attack computer 106 under the impression that the attack computer 106 is the target computer 102. Consequently, the attacker would be able to exert control over the target computer 102 and/or any other computer connected to the client computer 102. As mentioned above, this attack is facilitated by the fact that browsers only use domain name information and not IP address information to enforce the same origin policy for the objects 112.

According to one or more embodiments, the security module 124 facilitates the prevention of the DNS rebinding attack by determining the various indicia of suspicious behavior based on the identified modifications to the origin information 120. In one embodiment, the security module 124 evaluates the identified modifications as well as data related to various properties associated with the domain name to determine the various indicia of suspicious behavior, as explained further below. Once the various indicia of suspicious behavior is determined, the user of the client computer 102 may be alerted as to the various indicia of suspicious behavior and/or the implications of such suspicious behavior on the client computer 102 and/or any other computing device connected to the client computer 102. In one embodiment, the security module 124 generates an alert that includes steps to be performed in order to mitigate and/or prevent the attack. Optionally, the security module 124 may mitigate and/or prevent the web attack (e.g., automatically upon identification of the modification to the origin information 120). Options for mitigating (e.g., preventing) the web attack is described further below.

Optionally, the DNS module 122 generates the origin information 120 that includes data related to various properties associated with the domain name. For example, the origin information 120 may include various times associated with each binding between an IP address and a domain name. The security module 124 may evaluate the various times associated with each binding in order to determine the indicia of suspicious behavior. For example, two or more different IP addresses that resolve to the same domain name within a very short period of time strongly indicate suspicious behavior at the client computer 102.

Figure 2:
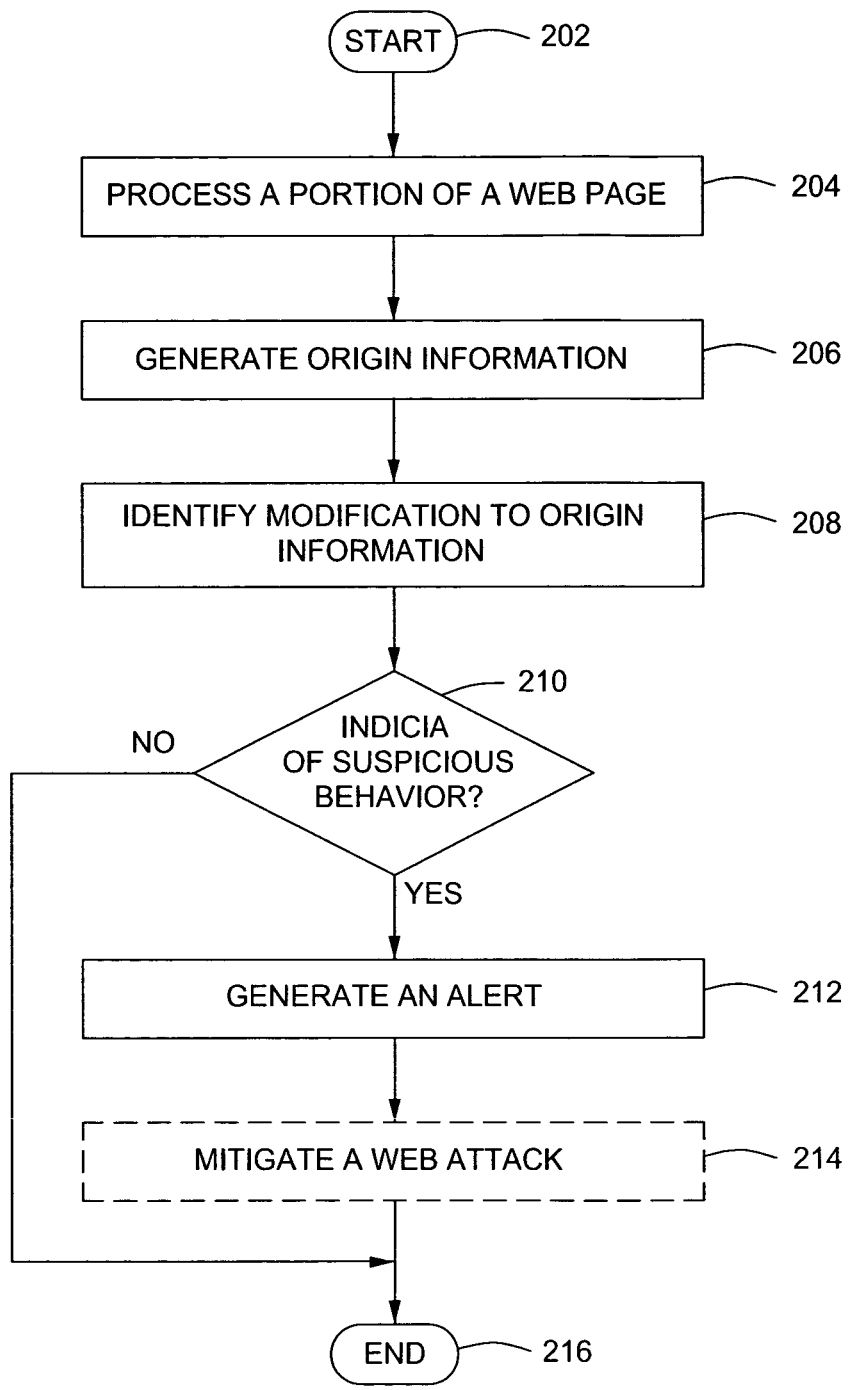
FIG. 2 is a flow diagram of a method of securing a computer, according to one or more embodiments of the present invention.

FIG. 2 is a method 200 for securing a computer. The method 200 begins at step 202 and proceeds to step 204. At step 204, a portion of a web page (e.g., one or more objects of the objects 112 of FIG. 1) is processed. In one embodiment, DNS information (e.g., domain name, IP address of web server and the like) for the portion (e.g., any object of the objects 112) of the web page is enumerated, as described below.

At step 206, origin information is generated for the portion of the web page. As described above, the origin information comprises a distinct domain name and/or a distinct IP address for each portion of the web page. In one embodiment, the origin information is a table that represents a mapping between each object of the plurality of objects 112 and a domain name and an IP address that resolves to the object. Hence, any modification to the origin information in a short period of time most likely indicates a web attack and/or another problem that affects the security of a client computer.

At step 208, one or more modifications to the origin information are identified. In one embodiment, any modification to the domain names and/or the IP addresses associated with any of the objects 112 is identified. At step 210, a determination is made as to whether there is an indicia of suspicious behavior with respect to the origin information based on the identified one or more modifications to the origin information. If any of the identified one or more modifications to the origin information indicate suspicious behavior, the method 200 proceeds to step 212. If none of the identified one or more modifications to the origin information indicate suspicious behavior, the method 200 proceeds to step 216. For example, there are some instances where a modification to the origin information could be benign (e.g., a legitimate web server is taken down and traffic to a particular domain name is routed to another domain name). As such, while the origin information has been modified, the modification does not indicate any suspicious behavior. Accordingly, the user does not have to be notified as to the modification.

At step 212, an alert is generated to warn the user of the indicia of suspicious behavior (e.g., a potential web attack (e.g., rebinding attack) against the client computer and/or any other computer coupled to the client computer). As described herein, the alert may be generated if multiple IP addresses resolve to the same domain and/or correspond to a same object of the plurality of objects 112. Furthermore, the alert may also indicate an occurrence of simultaneous communications to two or more IP addresses of the multiple IP addresses and/or a presence of one or more internal IP addresses and one or more external IP addresses amongst the multiple IP addresses. In one embodiment, the alert may be generated if multiple domain names correspond to the same object even though there are legitimate instances when multiple domain names would correspond to the same object. In another embodiment, the alert is used to determine an appropriate (e.g., most efficient) option for mitigating the web attack (e.g., terminate a browser window, block the web page, block access to the network 108, execute an anti-virus scan, ignore the alert and the like).

Optionally, the method 200 may perform step 214 where the web attack is mitigated and/or prevented altogether. Mitigation of the web attack is described further below. Alternatively, at step 214, the indicia of suspicious behavior may be evaluated to determine the appropriate option for mitigating the web attack. At step 216, the method 200 ends.

Figure 3:
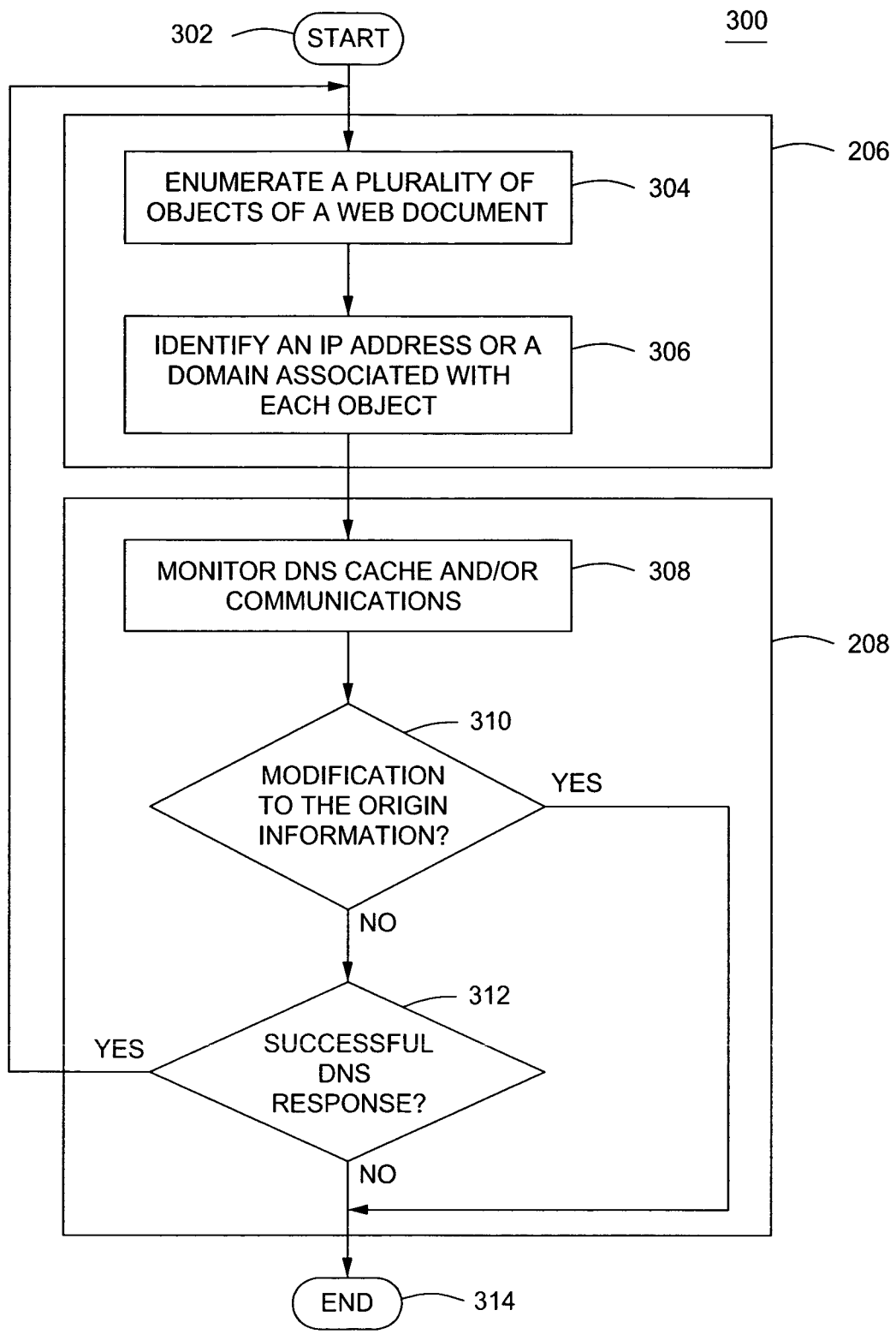
FIG. 3 is a flow diagram of a method of identifying a modification to the origin information, according to one or more embodiments of the present invention.

FIG. 3 is a method 300 for identifying a modification to the origin information. Steps 304-306 form one embodiment of the step 206 of FIG. 2. Steps 308-314 form one embodiment of the step 208 of FIG. 2. The method 300 begins at step 302 and proceeds to step 304. At step 304, a plurality of objects of a web page is enumerated. The entire web page is processed to identify each of the objects that form the web page. For example, the Internet Explorer Domain Object Model (DOM) permits access to each object of an IHTML document via OLE (i.e. IOLEContainer). In this example, a pointer to the IHTML document provided through the IOLEContainer enables access to each frame and enumeration of the DOM objects.

At step 306, an IP address and/or a domain name associated with each of the plurality of objects is identified. In one embodiment, DNS information (e.g., DNS cache and DNS communications) is examined to identify the domain name and/or the IP address associated with each of the plurality of objects. In the example above, the enumeration of the DOM objects in the IHTML document includes access to the DNS information (e.g., domain names) associated with each of the DOM objects.

At step 308, DNS cache and/or DNS-related communications (e.g., DNS queries and/or responses) are monitored. Modifications to the origin information are facilitated (e.g., achieved) through manipulation of the DNS cache and/or the DNS-related communications by a malicious program (e.g., the malicious program 126 of FIG. 1). In one embodiment, the DNS queries and/or responses include attempts to modify the origin information. At step 310, a determination is made as to whether the origin information has been modified. If the origin information has been modified, the method 300 proceeds to step 314. If the origin information has not been modified, the method 300 proceeds to step 312.

In one embodiment, the step 310 includes a determination is made as to whether the origin information has been modified to include multiple IP addresses associated with a single object of the plurality of objects or a single domain name. If the origin information includes multiple IP addresses associated with the single object and/or domain name, the method 300 proceeds to step 314. If the origin information does not include multiple IP addresses for the single object and/or domain, the method 300 proceeds to step 312.

According to another embodiment, the step 310 includes a determination that is made as to whether communications to at least two of the multiple IP addresses occurred at or around the same time (e.g., simultaneous). If communications to at least two of the multiple IP addresses occurred, then there is a strong indication that the client computer 104 is under a web attack (e.g., a DNS rebinding attack).

In another embodiment, the step 310 includes a determination that is made as to whether one of the multiple IP addresses is associated with an internal computer (e.g., the target computer 104 behind the same firewall as the client computer 102 of the user) and another one of the multiple IP addresses is associated with an external computer (e.g., the attack computer 106 positioned on the other side of the firewall). If one of multiple IP addresses is associated with the internal computer and another one of the multiple IP addresses is associated with the external computer, then the client computer 102 is most likely under a web attack.

At step 312, a determination is made as to whether a successful DNS response is received. If the successful DNS response is received, then the method returns to step 304. In one embodiment, receipt of the successful DNS response prompts the regeneration of the origin information for one or more objects of the plurality of objects. Any difference between the origin information and the regenerated origin information (e.g., a difference in a number of origins associated with a web page) indicates a modification to the origin information and a potential indicia of suspicious behavior (e.g., a rebinding attack). As described earlier, a user of the client computer 102 is alerted as to the indicia of suspicious behavior (e.g., likelihood of the rebinding attack). At step 314, the method 300 ends.

Figure 4:
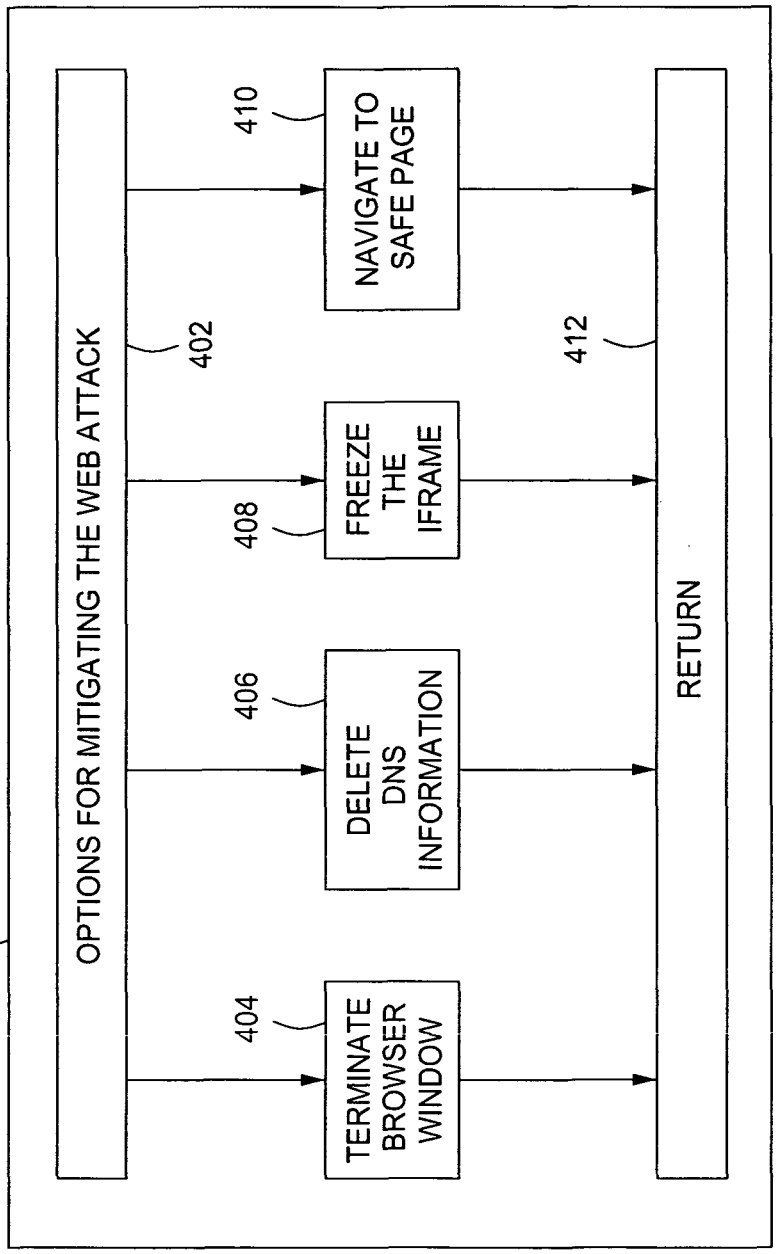
FIG. 4 is a flow diagram of a method of mitigating a web attack, according to one or more embodiments of the present invention.

FIG. 4 is a flow diagram of a method 400 for mitigating a web attack, according to various embodiments. In one or more embodiments, the method 400 mitigates malicious (web) content that tries to exploit the "same origin" policy. The method 400 is performed at step 212 of the method 200 described above. Hence, the method 400 returns to step 214 upon completion. At step 402, the method 400 selects an option for mitigating the web attack.

According to one embodiment, the method 400 selects a first option and proceeds to step 404. At step 404, a browser window is terminated. Accordingly, communications initiated by an attacker performed during presentation of a web page at the browser window are terminated. For example, the attack computer 106 will be unable to attack (e.g., hijack) the target computer 104 because the DNS information will no longer be used to download a plurality of objects that form the web page.

According to one embodiment, the method 400 selects a second option and proceeds to step 406. At step 406, DNS information (e.g., domain names and/or IP addresses) associated with the plurality of objects of the web page is deleted. Without the DNS information to manipulate, the attacker cannot rebind the IP address of any of the objects to the attack computer 106. Consequently, the attacker cannot attack (e.g., hijack) the client computer 102 and/or the target computer 104.

According to another embodiment, the method 400 selects a third option and proceeds to step 408. At step 408, an Iframe is frozen. Hence, communications between the target computer 104 and the client computer 102 are halted in order to prevent or mitigate the web attack. According to yet another embodiment, the method 400 selects a fourth option and proceeds to step 410. At step 410, the user is navigated away from the current web page to a safe web page. At step 412, the method 400 returns to the method 200, as described above.

In either embodiment, because data corresponding to any of the plurality of objects is not being currently communicated between the client computer 102 and the target computer 104, the attacker cannot rebind any of the plurality of objects to mount an attack. Accordingly, the attacker cannot exploit the trust developed between the client computer 102 and the target computer 104.

It is appreciated that various embodiments of the present invention include one or more additional options for mitigating the web attack, which are not described in FIG. 4. For example, the one or more additional options include (1) warning the user; (2) locking down computer resources (e.g., network) so that an attacker is unable to access the computer resources; (3) forcing the web page to be accessed from a first IP address (i.e., not permitting a second IP address to be bound to a same object or domain name as the first IP address); (4) submitting the domain name to a well-respected third party (e.g., SYMANTEC) for further analysis and possible blacklisting, (5) executing an anti-virus scan on the computer; and (6) comparing the domain name against blacklisted or known bad domain names. Furthermore, the origin information may include data related to various properties of the domain name (e.g., how long has the domain name been registered, who owns the domain name, etc.), which may be used to make a determination as to an appropriate option for mitigating the attack.

While the foregoing is directed to embodiments of the present invention, other and further embodiments of the invention may be devised without departing from the basic scope thereof, and the scope thereof is determined by the claims that follow.

The invention claimed is:

1. A method for identifying attacks in a computer system, comprising:
generating, via at least one computer processor, origin information for a portion of a web page;
identifying a modification in the origin information;
determining one or more indicators of suspicious behavior based on the identified modification in the origin information; and
identifying an attack based on the determined modification,
wherein generating the origin information further comprises identifying at least one of a domain or an address associated with the portion of the document, and
wherein identifying at least one of a domain or an address further comprises identifying the at least one of a domain or an address within at least one of Domain Name Service (DNS) communications or DNS cached information.

2. The method of claim 1, wherein generating the origin information further comprises enumerating each portion of the web page.

3. The method of claim 1, further comprising evaluating the identified modification in the origin information to determine the one or more indicators of suspicious behavior.

4. The method of claim 1, wherein identifying the modification further comprises determining at least two addresses associated with a single domain.

5. The method of claim 1, wherein identifying the modification further comprises determining at least two domains associated with a single address.

6. The method of claim 1, wherein identifying the modification further comprises determining at least one external address associated with a domain and at least one internal address associated with the domain.

7. The method of claim 1, wherein identifying the modification further comprises identifying simultaneous communications to at least two addresses associated with a domain.

8. The method of claim 1, further comprising mitigating a DNS rebinding attack based on the identified modification in the origin information.

9. An apparatus for identifying attacks in a computer system, comprising:
a memory having origin information;
a Domain Name Service (DNS) module for enumerating a plurality of objects of a web page to generate the origin information; and
a security module for determining a modification to the origin information during interaction with the web page, determining one or more indicators of suspicious behavior based on the modification to the origin information, and identifying an attack based on the based on the determined modification.

10. The apparatus of claim 9, wherein the origin information further comprises information regarding an address associated with a domain where the domain is associated with at least one of the plurality of objects.

11. The apparatus of claim 9, wherein the DNS module identifies at least one of a domain or an address associated with each of the plurality of objects of the web page.

12. The apparatus of claim 9, wherein the security module determines at least two addresses associated with a single domain.

13. The apparatus of claim 9, wherein the security module determines at least one external address associated with a domain and at least one internal address associated with the domain.

14. The apparatus of claim 9, wherein the security module identifies simultaneous communications to at least two addresses associated with a domain.

15. The apparatus of claim 9, wherein the security module evaluates the modification to the origin information to determine the one or more indicators of suspicious behavior.

16. A system for identifying attacks in a computer system, comprising:
a target computer, comprising:
at least one object associated with a document;
a client computer, comprising:
a Domain Name Service (DNS) module for processing the at least one object of the document from the target computer to generate origin information regarding at least one of a domain or an address associated with each of the at least one object, and
a security module for determining a modification to a portion of the origin information associated with the at least one object of the document, determining one or more indicators of suspicious behavior based on the modification to the portion of the origin information, and identifying an attack based on the determined modification.

17. The system of claim 16, wherein the identified attack is an attacker program within the client computer.

18. The system of claim 16, wherein the security module terminates communications between the client computer and an attacker computer.

* * * * *